United States Patent [19]

Jacques

[11] Patent Number: 5,165,709
[45] Date of Patent: Nov. 24, 1992

[54] SNOWMOBILE SKI INCLUDING RUNNER, SOLE AND STIFFENER

[75] Inventor: Michel Jacques, St-Elie d'Orford, Canada

[73] Assignee: Bombardier Inc., Canada

[21] Appl. No.: 547,240

[22] Filed: Jul. 3, 1990

[51] Int. Cl.$^5$ .............................................. B62B 17/02
[52] U.S. Cl. ..................................................... 280/28
[58] Field of Search ...................... 280/28, 15, 22, 22.1, 280/25, 26, 27, 28.13, 28.17, 14.1, 18, 28.14

[56] References Cited

U.S. PATENT DOCUMENTS

| | | | |
|---|---|---|---|
| 364,306 | 7/1887 | Schroder | 280/18 |
| 1,108,160 | 8/1914 | Field et al. | 280/28 |
| 2,539,817 | 1/1951 | Ditter | 280/28 |
| 2,824,746 | 2/1958 | Schummer | 280/28 |
| 3,432,181 | 3/1969 | McKee | 280/18 |
| 3,482,849 | 12/1969 | Puetz | 280/28 |
| 3,632,126 | 1/1972 | Shorrock | 280/28 |
| 3,643,979 | 2/1972 | Richards | 280/28 |
| 3,711,109 | 1/1973 | Hofbauer | 280/28 |
| 3,718,341 | 2/1973 | Westberg | 280/28 |
| 3,765,695 | 10/1973 | McGregor | 280/28 |
| 3,773,343 | 11/1973 | Ambrose | 280/28 |
| 3,850,440 | 11/1974 | Reedy et al. | 280/28 |
| 3,857,578 | 12/1974 | Alton | 280/28 |
| 3,866,933 | 2/1975 | Mollring | 280/28 |
| 4,077,639 | 3/1978 | Reedy | 280/28 |
| 4,291,892 | 9/1981 | Berthold et al. | 280/28 |
| 4,591,174 | 5/1986 | White | 280/28 |

FOREIGN PATENT DOCUMENTS

| | | |
|---|---|---|
| 625070 | 8/1961 | Canada . |
| 828641 | 12/1969 | Canada ................................ 280/28 |
| 983072 | 2/1976 | Canada . |
| 1007274 | 3/1977 | Canada . |
| 1008111 | 4/1977 | Canada . |

OTHER PUBLICATIONS

Advertisement TS 101 Tunnel Skis of Ultimate Sports, Inc. published in "Snow Week", Winter 1988-1989.

Primary Examiner—David M. Mitchell
Assistant Examiner—Brian L. Johnson
Attorney, Agent, or Firm—Larson and Taylor

[57] ABSTRACT

A snowmobile ski is made of two main parts, namely a steel stiffener and a sole made of ultra high molecular weight polyethylene (UHMW-PE) to which a friction reducing additive has been added. The front handle is molded integrally with the ski sole and then bent back and secured to the sole and stiffener. The sole has upstanding projections on which the stiffener rests so that spaces are provided which allow the sole to deflect when impacted thereby reducing transmission of impacts to the stiffener. The stiffener is formed with a main stiffener and secondary stiffeners provided only when the ski is to be attached to the suspension assembly. The secondary stiffeners coact with the main stiffener to increase the strength and rigidity while minimizing the weight increase.

7 Claims, 4 Drawing Sheets

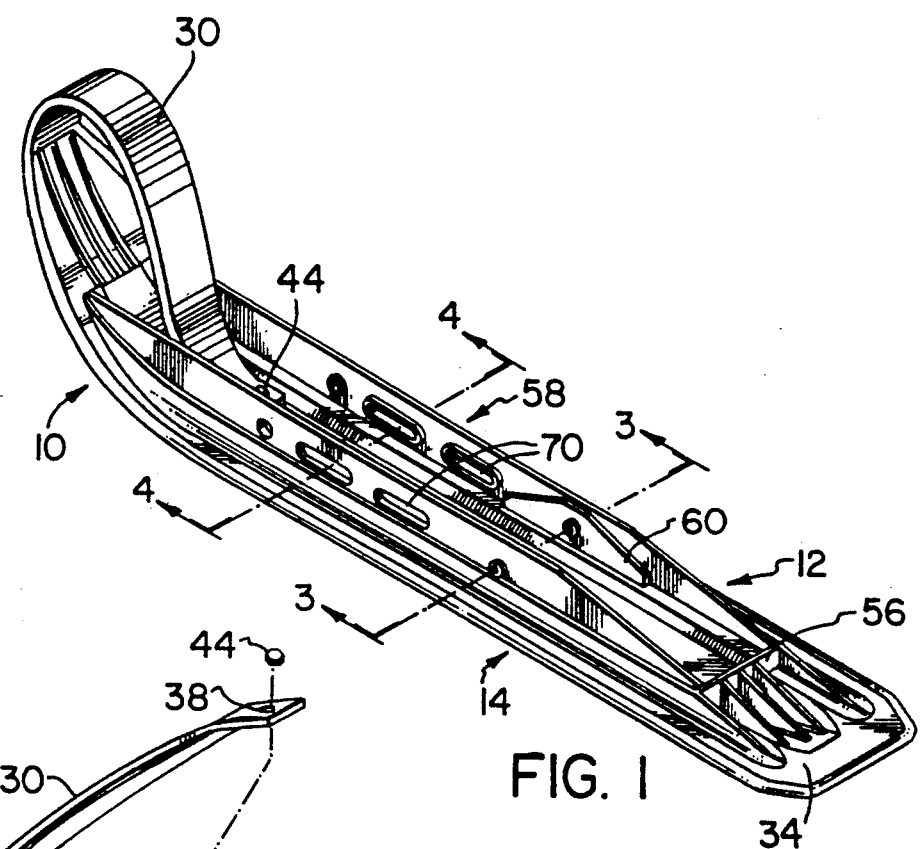
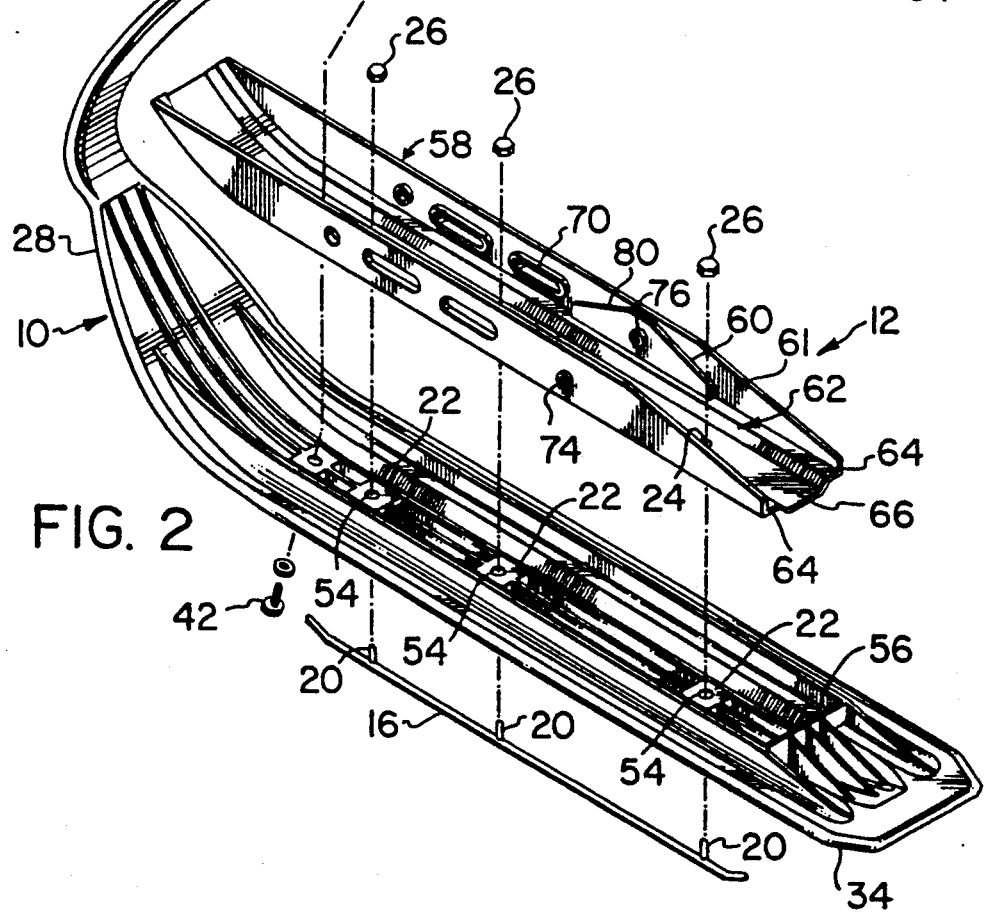

SNOWMOBILE SKI INCLUDING RUNNER, SOLE AND STIFFENER

BACKGROUND OF THE INVENTION

1. Field of the Invention

This invention relates to snowmobile skis.

2. Description of the Prior Art

Traditionally all snowmobile skis have been made of steel. A backbone is welded to the sole to form a closed box or an open U-shape.

Some skis, not for snowmobiles, have been made of reinforced plastics, plastics and wood or a combination of these materials.

Recently a snowmobile ski has been proposed by Ultimate Sports Inc. in which the ski is made of two main parts, namely a cast aluminum backbone or stiffener and a sole made of ultra high molecular weight-polyethylene (UHMW-PE). According to this design characteristics such as the static and dynamic coefficients of friction, dynamic stability and turning response of the ski can be determined by choice of material of the sole and profile of the sole, while characteristics such as ability to withstand static and dynamic loads are determined by design of the stiffener. By separating out these two different sets of parameters the ski design can be optimized.

The ski proposed by Ultimate suffers from the following disadvantages. Firstly, the bottom of the stiffener is flat and it rests on top of a flat upper surface of the sole. Thus, impacts on the sole are transmitted directly through to the stiffener which would have the effect of weakening the stiffener.

Secondly, when the ski is to be mounted to a suspension assembly of the snowmobile, the stiffener is thickened to increase the strength and rigidity at that point. However, the increase in thickness greatly increases the overall weight of the ski which is undesirable.

Thirdly, the UHMW-PE used in the sole is subject to wear.

Fourthly, the front handle of the ski is formed of a separate component, adding to manufacturing and assembly costs.

Fifthly, the use of cast aluminum for the main stiffener is more expensive compared to the use of a steel stiffener.

SUMMARY OF THE INVENTION

It is an object of the present invention to obviate or mitigate one or more of these disadvantages.

This is achieved, according to one aspect of the present invention, by providing a ski for a snowmobile, the ski having an upwardly curved forward end and comprising a sole made of a plastics material, a runner at the underside of the sole and a rigid metal stiffener on top of the sole and means securing the runner, sole and stiffener together wherein the sole is provided with upstanding projections on which the stiffener rests, spaces between the projections allowing the sole to deflect when impacted thereby reducing transmission of impacts to the stiffener.

In a preferred embodiment the projections are formed of spaced ribs extending along the sole.

According to another aspect of the invention an effect similar to that achieved by thickening the stiffener at the location where the ski is to be attached to the suspension assembly is achieved by providing instead secondary stiffener members only at that location. The secondary stiffener members coact with the main stiffener and increase the strength and rigidity while minimizing the weight increase.

According to a further aspect of the invention, additives such as organic peroxides and/or glass microspheres are added to the UHMW-PE to increase wear resistance of the sole.

In another aspect of the invention, the front handle is integrally formed with the ski sole in the one molding process after which the handle is bent back and secured to the sole and stiffener. This allows the use of only one tool to fabricate the handle and the ski sole and simplifies assembly. Another result is a reduction in weight. It also allows the front end of the ski to be flexible and thus to take high impacts without damaging the ski.

The use of steel instead of cast aluminum as the material in a preferred embodiment of the invention reduces the cost.

BRIEF DESCRIPTION OF THE DRAWINGS

The invention will now be described in greater detail with reference to the accompanying drawings, in which:

FIG. 1 is a perspective view of a new ski constructed according to the invention;

FIG. 2 is an exploded perspective view of the ski of FIG. 1;

DETAILED DESCRIPTION OF THE INVENTION

Figure 3:
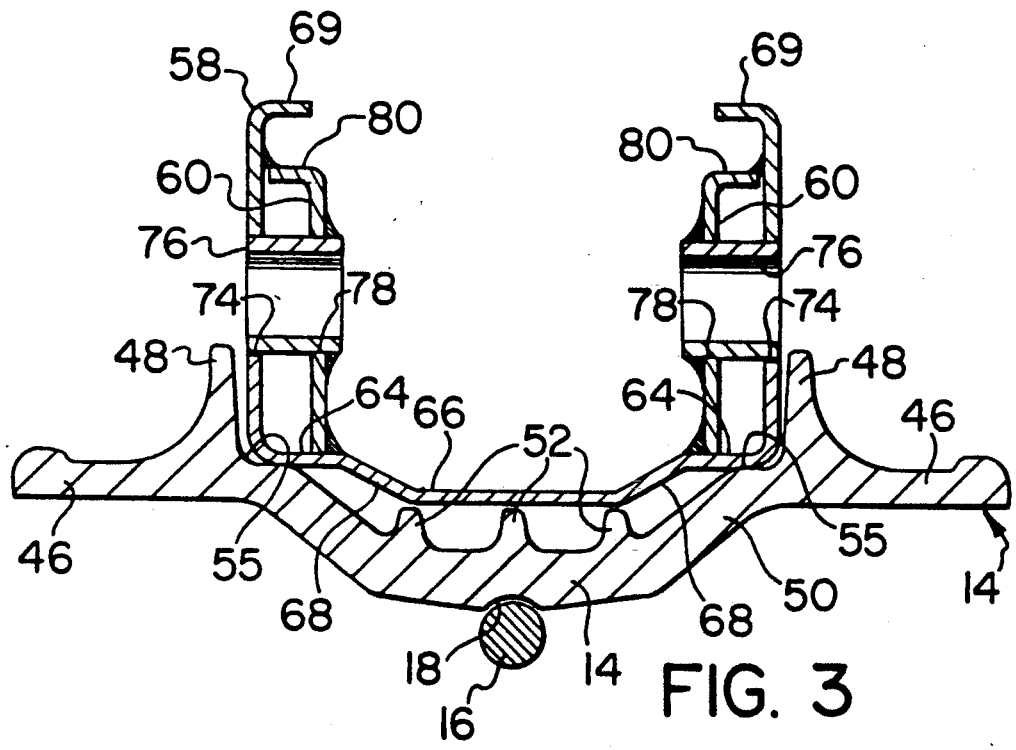
FIG. 3 is a sectional view taken on 3—3 of FIG. 1.

Referring to the drawings, a ski 10 is formed of two principal parts, namely a backbone or stiffener 12 and a sole 14. The stiffener 12 is made of metal such as stamped steel coated with powder epoxy to protect it against corrosion and wear. Other metals such as aluminum magnesium also could be used. The sole 14 is made of plastic material, a preferred material being ultra high molecular weight-polyethylene (UHMW-PE) to which an additive to improve wear resistance has been added. Different additives e.g. organic peroxide and glass microspheres can be used for this purpose but the inventors have determined in tests that an organic peroxide in conjunction with glass microspheres in an amount of approximately 5% by weight as additive gives good results for a snowmobile ski sole, and also that the use of these additives separately gives good results.

As seen in FIGS. 2 and 3 a steel runner 16 forms a third component of the ski. The runner 16 is accommodated partly in a recess 18 extending lengthwise along the underside of the sole 14, as seen particularly in FIG. 3. The runner has upstanding integral stud portions 20 provided at spaced locations along the runner. The stud portions 20, which are threaded at their free ends, are received through holes 22 in the sole 14 and aligned holes 24 in the stiffener 12. Lock nuts 26 received in the threaded ends of the stud portions 20 secure the runner, sole and stiffener together.

Figure 4:
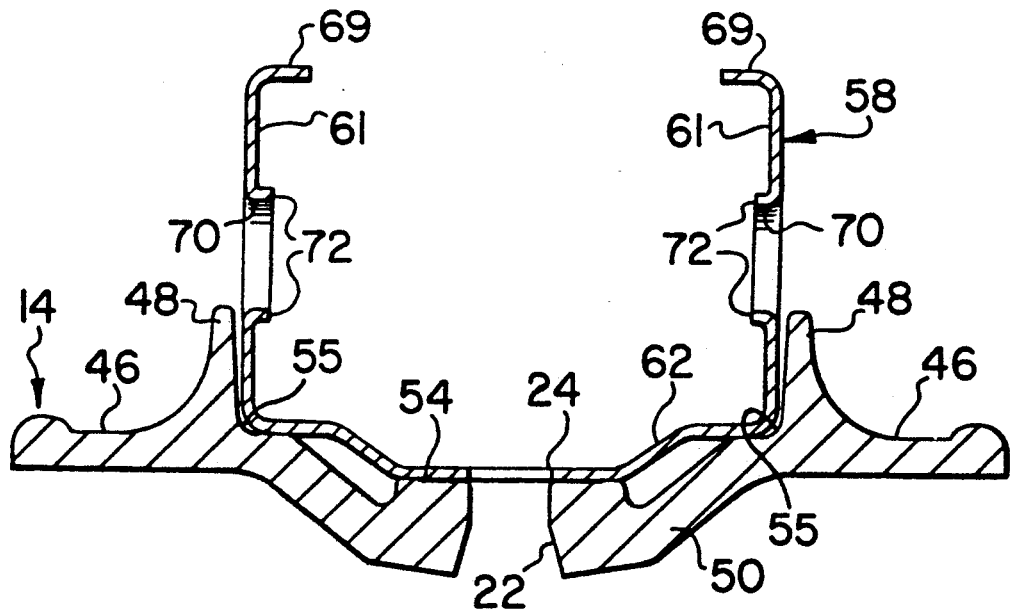
FIG. 4 is a sectional view taken on 4—4 of FIG. 1.
Figure 5:
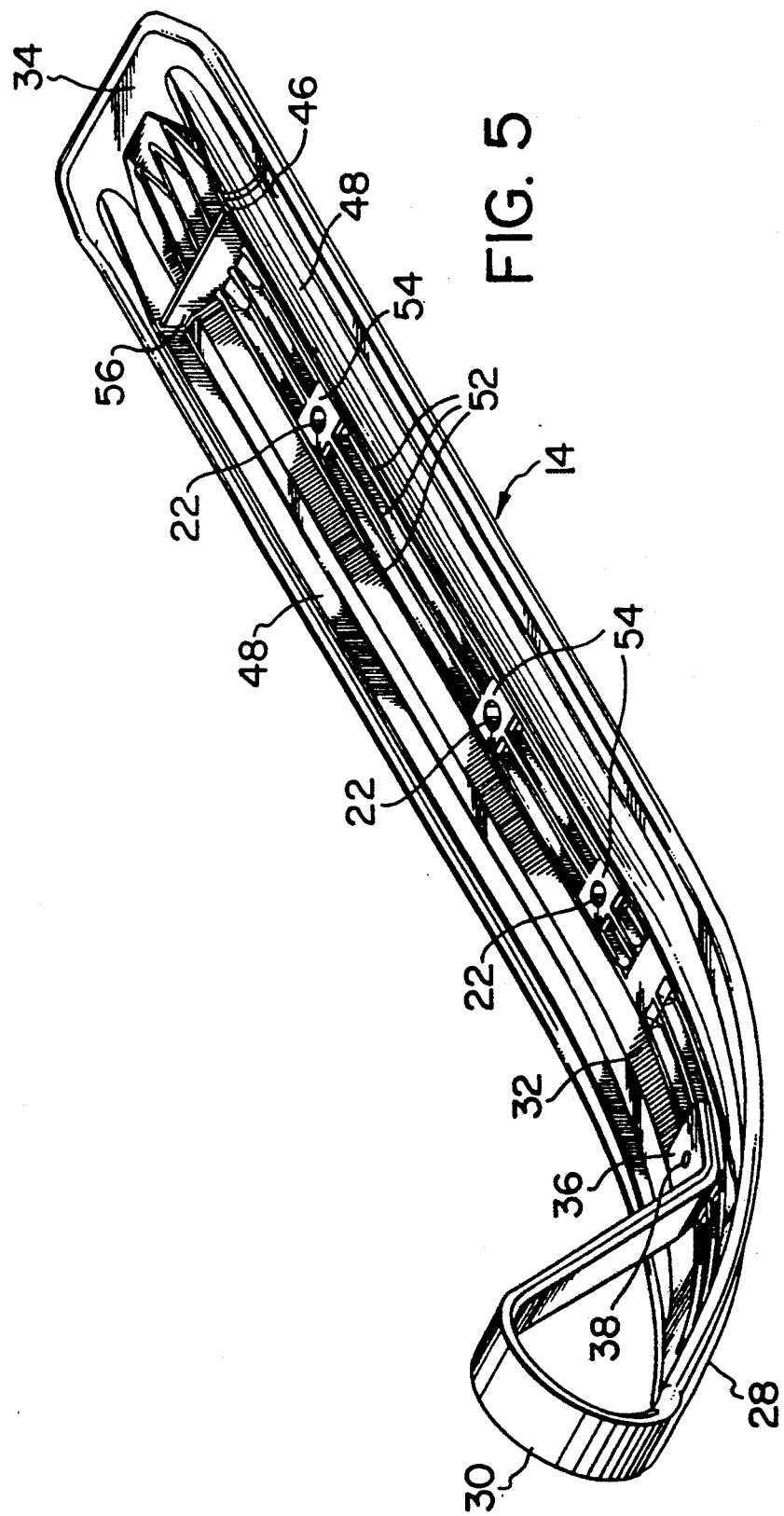
FIG. 5 is a perspective view of the ski sole used in the ski of FIGS. 1 to 4, illustrating detailed features of the sole.

Details of the structure of sole 14 are seen most clearly in FIGS. 3, 4 and 5. The sole 14 is elongate with an upwardly curved forward end 28, from the leading end of which extends an integrally formed handle 30 that is bent back into engagement with the upper surface 32 of the sole, and a slightly upwardly sloping rear end 34.

Figure 6:
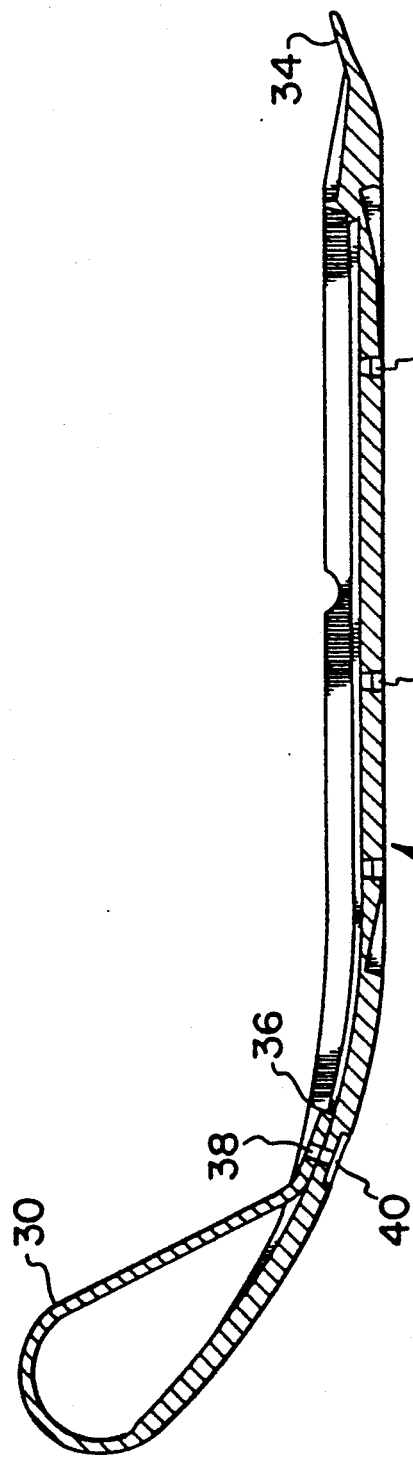
FIG. 6 is a side view of the ski sole of FIG. 5.

The handle 30 has a free end portion 36 which is conformed generally to the shape of the curved forward end 28 of the sole and has therein a through hole 38 which is aligned with a through hole 40 (FIG. 6) in the sole. As seen in FIGS. 1 and 2, a bolt 42 is received through the hole 40 in sole 14, then through an aligned hole 24 in stiffener 12 and finally through hole 38 in handle 30. A nut 44 secures the free end 36 of the handle to the stiffener 12.

As seen in FIGS. 3 and 4, in section the sole 14 has two generally flat, horizontal marginal portions 46 extending most of the length of the sole and into the curved forward end 28. The inner sides of the marginal portion 46 are bonded by respective upstanding ribs 48 running lengthwise along the sole. The central portion 50 of the sole located between the two ribs 48 is formed generally as a shallow U along the lower surface of which runs the recess 18 for receiving the runner 16. From the upper surface of the central portion extend three vertical spaced ribs 52 extending lengthwise along the sole. At the locations of the holes 22 and 40 the ribs merge to form flat platforms 54. Outwardly of the ribs 52 the upper surface of the central portion of the sole 14 is formed with two flat, horizontal margins 55 located adjacent the ribs 48. As seen in FIGS. 1, 2 and 5 a transverse rib 56 is located at a short spacing from the rear end of the sole, rib 56 extending between ribs 48.

The stiffener 12 is formed of a main stiffener member 58 and two secondary stiffeners 60. The main stiffener 58 is generally channel shaped, having two upstanding sides 61 joined by a bottom 62. The bottom 62 has two horizontal marginal portions 64 and a central depressed portion 66 joined to the marginal portions 64 by means of sloping portions 68. In the longitudinal direction the bottom 62 of this stiffener 58 curves upwardly at the forward portion of the stiffener to conform to the shape of the sole. The sides 61 of stiffener 58 have inturned horizontal flanges 69 at their free ends. The sides 61 are provided with some elongate through holes 70 which, as seen in FIG. 4, have inturned stiffening flanges 72. The holes are provided to reduce weight and the flanges 72 are provided to increase the resistance to flexure. Also provided in sides 61 are aligned round holes 74 which, as seen in FIG. 3, receive steel bushings 76.

The bushings 76 also pass through aligned holes 78 in the secondary stiffeners 60, which are identical to each other and each of which is formed as a plate having a horizontal bottom edge and a top edge which is shaped like a shallow inverted V and which has an outturned flange 80.

As seen in FIG. 3, the secondary stiffeners 60 are welded to the respective main stiffeners 58 where the flanges 80 engage the sides 61 and where the bottom edges engage the marginal portions 64 of the bottom 62. The secondary stiffeners are also welded to the respective bushings 76. In use, a pivot pin (not shown) is received through the bushings 76 for pivotal connection of the ski 10 to an appropriate suspension assembly of the snowmobile.

As seen in FIG. 3, the stiffener 12 is received with slight clearance between the two ribs 48 of sole 14 with the bottom 62 of the main stiffener resting on portions of the sole located between the two ribs 48. More particularly, the central depressed portion 66 of the bottom rests on the tops of the three vertical ribs 52 with the marginal portions 64 of the bottom resting on the margins 55. The transverse rib 56 serves, as seen in FIG. 1, as a stop for the rear edge of stiffener 58.

Figure 7:
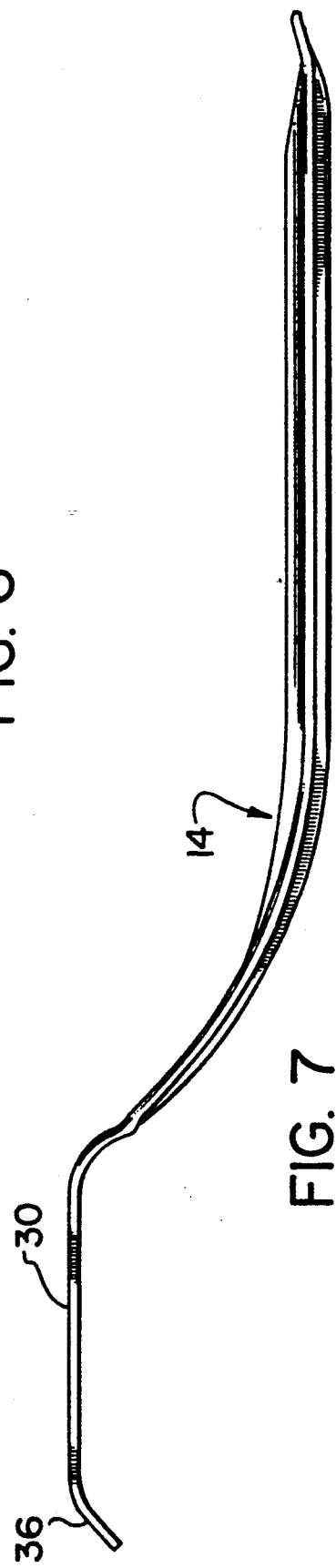
FIG. 7 is a side view of the ski sole after molding but before bending into final shape.

In manufacturing the sole a compression molding process is used resulting in the molded sole shape shown in FIG. 7 in which the handle 30 extends away from the sole 14 and generally parallel to the major portion of the sole. When assembling the stiffener 12 to sole 14 the handle 30 is simply bent back by hand and secured by the nut and bolt as explained above.

What I claim as my invention is:

1. A ski for a snowmobile, the ski having an upwardly curved forward end and comprising a sole made of a plastics material, the sole having an upper surface, a lower surface and a forward end, a runner at the lower surface of the sole and a rigid metal stiffener on the upper surface of the sole and means securing the runner, sole and stiffener together, in which the stiffener is formed of a main stiffener member formed generally as a channel extending along a major portion of the sole length, the channel having two spaced sides and a bottom interconnecting the sides, and two respective secondary stiffener members secured to the main stiffener member and associated with a respective channel side, the secondary stiffener members provided at a pivot mounting location for a suspension assembly, each secondary stiffener member having a plate portion extending over the pivot location and spaced form the associated channel side and having a portion abutting associated channel side whereby the stiffener is effectively strengthened at the pivot location.

2. A ski according to claim 1, wherein the abutting portion of each secondary stiffener member is a right angled flange provided at an upper edge of the plate portion, a lower edge of the plate portion rests on the bottom of the main stiffener member and the secondary stiffener members are welded to the main stiffener member at the flanges and the lower edges.

3. A ski according to claim 1 in which the main stiffener member is provided with through holes to decrease a weight of the main stiffener member, each through hole being turned in at an edge of the through hole thereby providing a stiffening flange.

4. A ski according to claim 1 wherein two aligned bushings are provided at the pivot location, one bushing extending through one of the secondary stiffener members and one side of the main stiffener member and the other bushing extending through the other secondary stiffener and the other side of the main stiffener member.

5. A ski for a snowmobile, the ski having an upwardly curved forward end and comprising a sole made of a plastics material, the sole having an upper surface, a lower surface and a forward end, a runner at the lower surface of the sole and a rigid metal stiffener on the upper surface of the sole and means securing the runner, sole and stiffener together wherein the sole is provided on the upper surface with upstanding projections on which the stiffener rests, the projections defining spaces therebetween, which spaces between the projections allow the sole to deflect when impacted thereby reducing transmission of impacts to the stiffener and wherein the stiffener is formed of a main stiffener member formed generally as a channel extending along a major portion of the sole length, the channel having two spaced sides and a bottom interconnecting the sides, and two respective secondary stiffener members secured to the main stiffener member and associated with a respective channel side, the secondary stiffener members provided at a pivot mounting location for a suspension assembly, each secondary stiffener member having a plate portion extending over the pivot location and spaced from the associated channel side and having a portion abutting the associated channel side whereby the stiffener is effectively strengthened at the pivot location.

6. A ski according to claim 5 wherein the forward end of the sole is integrally formed with an elongate strap which is bent back and secured at a free end to the stiffener and sole thereby providing a handle.

7. A ski according to claim 6 wherein the sole and handle are made of ultra high molecular weight polyethylene (UHMW-PE) including an additive of at least one of an organic peroxide and glass microspheres.

* * * * *

UNITED STATES PATENT AND TRADEMARK OFFICE
CERTIFICATE OF CORRECTION

PATENT NO. : 5,165,709
DATED : November 24, 1992
INVENTOR(S) : JACQUES, Michel

It is certified that error appears in the above—identified patent and that said Letters Patent is hereby corrected as shown below:

Column 4, line 31 (in claim 1), please change "form" to --from--.

Col. 4, line 32, after "abutting" insert --the--

Signed and Sealed this

Twenty-sixth Day of October, 1993

Attest:

BRUCE LEHMAN

Attesting Officer     Commissioner of Patents and Trademarks